United States Patent [19]

Stevens et al.

[11] Patent Number: 5,596,787
[45] Date of Patent: Jan. 28, 1997

[54] WIPING DEVICE FOR INTERIOR SURFACES OF VEHICLE WINDSHIELD GLASS

[76] Inventors: Elwood L. Stevens; Valinda Houghton, both of 1464 Liberty Ave., Ogden, Utah 84404

[21] Appl. No.: 512,661

[22] Filed: Aug. 8, 1995

[51] Int. Cl.⁶ .................................................. A47L 1/15
[52] U.S. Cl. ...................... 15/220.1; 15/144.2; 15/228; 15/232
[58] Field of Search .................. 15/144.2, 147.1, 15/147.2, 220.1, 228, 231, 232

[56] References Cited

U.S. PATENT DOCUMENTS

| | | | |
|---|---|---|---|
| 1,675,736 | 7/1928 | Sturgis | 15/228 |
| 2,212,172 | 8/1940 | Veeck | 15/228 |
| 3,012,264 | 12/1961 | Nash | 16/144.2 |
| 3,224,025 | 12/1965 | Altrock | 15/144.2 |
| 3,720,976 | 3/1973 | Bailey | 15/144.2 |
| 3,991,431 | 11/1976 | Thielen | 15/228 |
| 4,475,262 | 10/1984 | Downer | 15/144.2 |
| 4,580,307 | 4/1986 | Moss | 15/144.2 |
| 4,648,738 | 3/1987 | Thielen | 15/144.2 |
| 4,852,210 | 8/1989 | Krajicek | 15/228 |
| 4,971,471 | 11/1990 | Sloan | 15/228 |
| 5,333,347 | 8/1994 | Stranders | 15/144.2 |

FOREIGN PATENT DOCUMENTS 798408  3/1936  France ................................. 15/228

*Primary Examiner*—Stephen F. Gerrity
*Assistant Examiner*—Randall E. Chin
*Attorney, Agent, or Firm*—A. Ray Osburn

[57] ABSTRACT

A device for cleaning the inside surfaces of vehicle windshield glass. A flat wiping member has an elongate handle secured to pivot simultaneously about a pair of perpendicularly arranged axes. The handle may be rotated into positions parallel to the wiping member, to reach into sharply angled recesses between the glass and dashboard.

2 Claims, 4 Drawing Sheets

5,596,787

WIPING DEVICE FOR INTERIOR SURFACES OF VEHICLE WINDSHIELD GLASS

BACKGROUND OF THE INVENTION

1. Field

The field of the invention is devices for scrubbing, and cleaning glass surfaces, more particularly such surfaces on the inside surface of vehicle windshields.

2. State of the Art

The most common device for cleaning automobile windshields comprises a cylinder of water absorbent foam material contained within a wrapping of rough netting of nylon or other plastic material. The nylon netting provides a rough glass contacting surface to forcibly wear away deposited material from collision with insects during motion of the vehicle. Typically, the nylon and foam head is connected rigidly to an elongate handle, to reach across the width of the windshield. A thin wedge of resilient material extending from the handle oppositely to the foam head is commonly known as a "squeegee", and is used to remove water and detritus from the windshield after thorough scrubbing. However, this device for scrubbing the exterior of the windshield is singularly unsuited for scrubbing the interior side of the windshield glass. The copious supply in the foam drips upon the dashboard, seats and the like, within the vehicle. The thick profile and rigid construction prevents reaching reach into confined spaces at the junctions of the windshield glass with doorframes and dashboard. At the present time, the inside of the windshield must be cleaned without benefit of any aiding device. The glass cleaning liquid, typically containing ammonia, must be applied with an impregnated cloth by hand or sprayed from a container. It is necessary to manually wipe the surface of the glass, reaching into the cramped areas described above. This method is not highly effective because of the tenderness of the hands and fingers, called upon to be used in such confined spaces. It is difficult to apply sufficient scrubbing force by the hand and fingers alone. Nor is the glass cleaning liquid benign to the skin of the hands and fingers.

Therefore, an improved device is needed for wiping the interior surface of the windshield glass of vehicles, which avoids injury to the hand and fingers, and which allows forcible wiping pressure to be applied to the inside glass even in hard-to-reach areas.

BRIEF SUMMARY OF THE INVENTION

With the foregoing in mind, the present invention eliminates or substantially alleviates the shortcomings and disadvantages of prior art vehicle window scrubbing and cleaning devices for interior surfaces of windshield glass. The invention comprises a thin, substantially rigid, planar wiping head to which the end of an elongate handle is secured to pivot about both of a pair of axes directed perpendicularly to each other. A pair of spaced apart pivot posts protrude outwardly from the wiping head and carry a pivot pin parallel thereto, about which a sleeve is loosely installed. The sleeve has a radially protruding boss secured by a handle pivot pin to a clevis on the near end of the handle.

The handle is rotatable into a position substantially parallel to the plane of the wiping head, so that the device is insertable into narrow spaces, for example at the juncture of the windshield glass with the vehicle dashboard. In such limited access positions, pressure may be brought to bear upon the glass by downward twisting of the far end of the handle perpendicularly to its longitudinal axis. By simultaneously twisting the handle perpendicularly to and around its longitudinal axis, localized portions of the head may be forced against the glass. This allows difficult spots on the glass to be scrubbed with concentrated force.

Preferably, the glassware side of the working head carries a thin layer of resilient material which conforms to the contours of windshield glass. Advantageously, the shape of the glass contacting head may include two portions converging to a rounded tip, and two square corners. The shape of the working head allows the head to conform to the edges of the windshield glass by rotating about the handle pin.

It is therefore the principal object of the invention to provide an improved wiper for the inside surface of vehicle windshield glass, to provide access to sharply angled niches between the windshield glass and the dashboards. It is a further object to provide such a device which rotates to conform readily to the edge shapes of the windshield glasses, and upon which general and localized force may be applied by manipulation of the handle, to improve the wiping efficiency.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
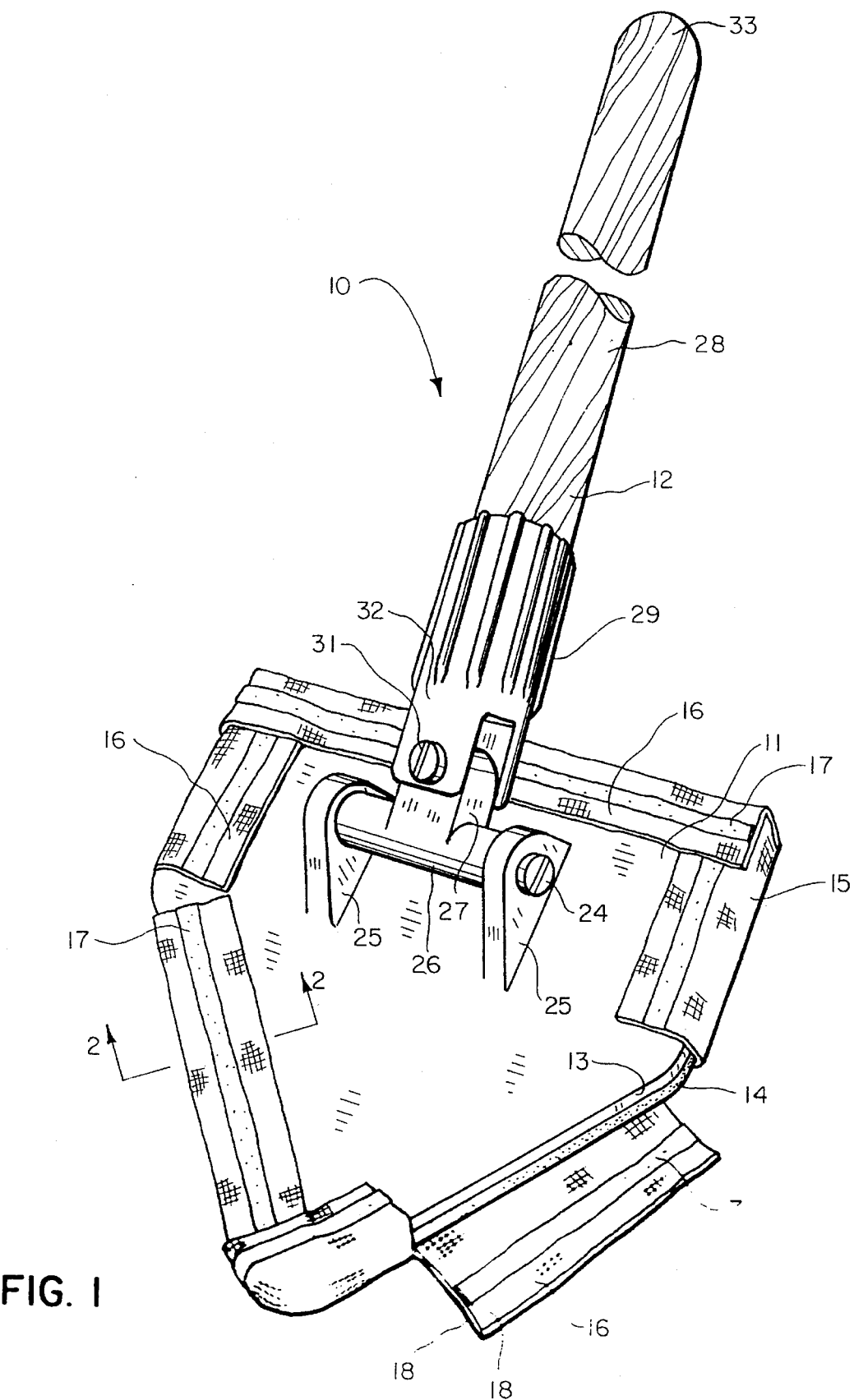
FIG. 1 is a top perspective view of a windshield wiping device in accordance with the invention, drawn to a reduced scale, FIG. 2 a vertical cross sectional view of a fragment of the working head of FIG. 1 with the wiping head cover attached, drawn to substantially full scale, FIG. 3 a view of the wiper of FIG. 1 being inserted into the space between the windshield glass in the dashboard of a vehicle, drawn to a reduced scale, FIG. 4 a side elevation view of the wiper of FIG. 1, showing the handle assembly rotated into a position parallel to the plane of the head, drawn to a reduced scale, FIG. 5 a representation of the wiper device of FIG. 1, with the handle rotated to various positions within a plane perpendicular to the plane of the head and to the axis of the head pivot pin, drawn to a reduced scale, FIG. 6 a representation of the wiping device of FIG. 1, with the handle shown rotated about the handle pivot pin in directions perpendicular to the plane indicated in FIG. 5, drawn to the same scale, and FIG. 7 a side view of the wiper of claim 1, showing the application of force to the head by twisting the distal end of the handle thereof, drawn to a reduced scale.
Figure 2:
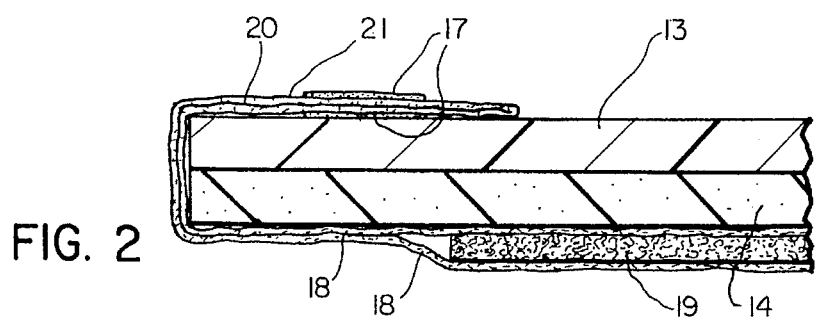

The windshield glass interior surface wiper 10 comprises a generally planar head assembly 11 to which is pivotally affixed an elongate handle assembly 12 to stiff uppermost plate 13. (FIGS. 1 and 2) A resilient layer 14 covers the lower, glass facing, surface of plate 13. A glass contacting head sheath 15 covers resilient layer 14, secured as by adhesive strips 17 on folded flaps 16. Head sheath 15 is reversible, comprising a pair of sheets 18 of strong scrubbing paper enclosing a moisture absorbing pad 19. Flap portions 20 of the paired scrubbing sheets are adhesively joined to form flaps 16. Adhesive strips 17 are provided on opposite sides of flap 16, covered until use by removable strips 21.

Figure 3:
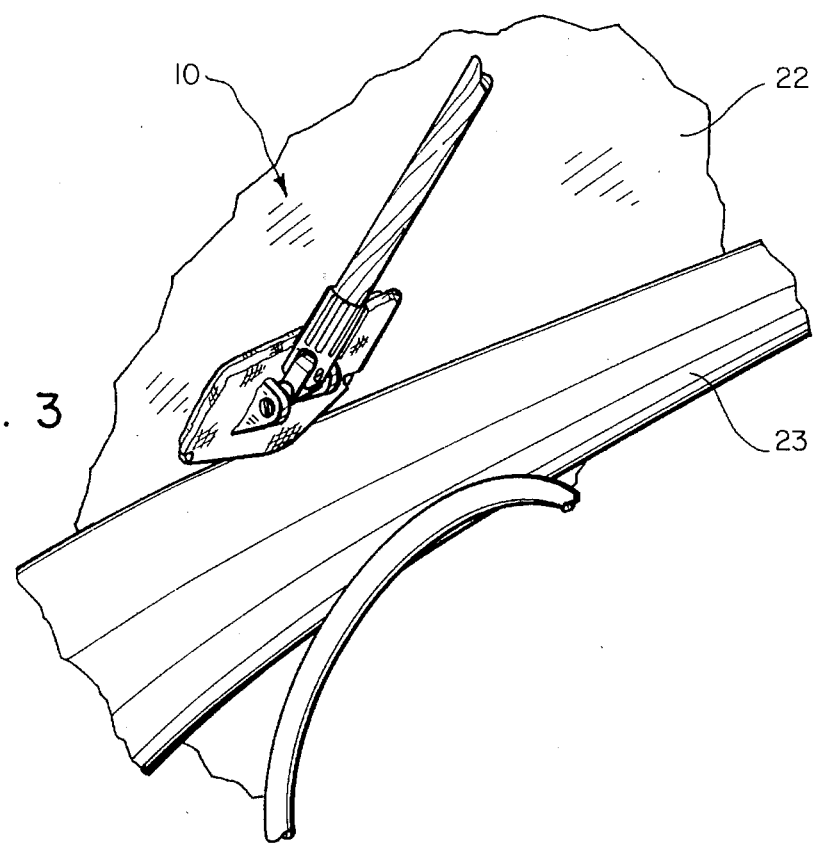
Figure 4:
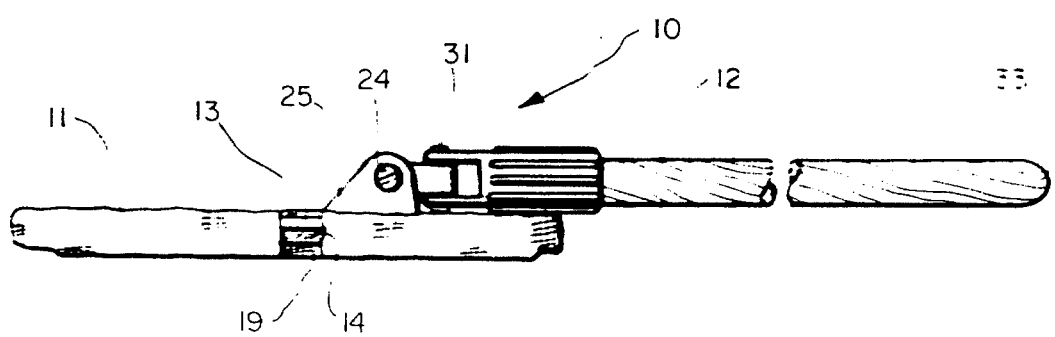
Figure 5:
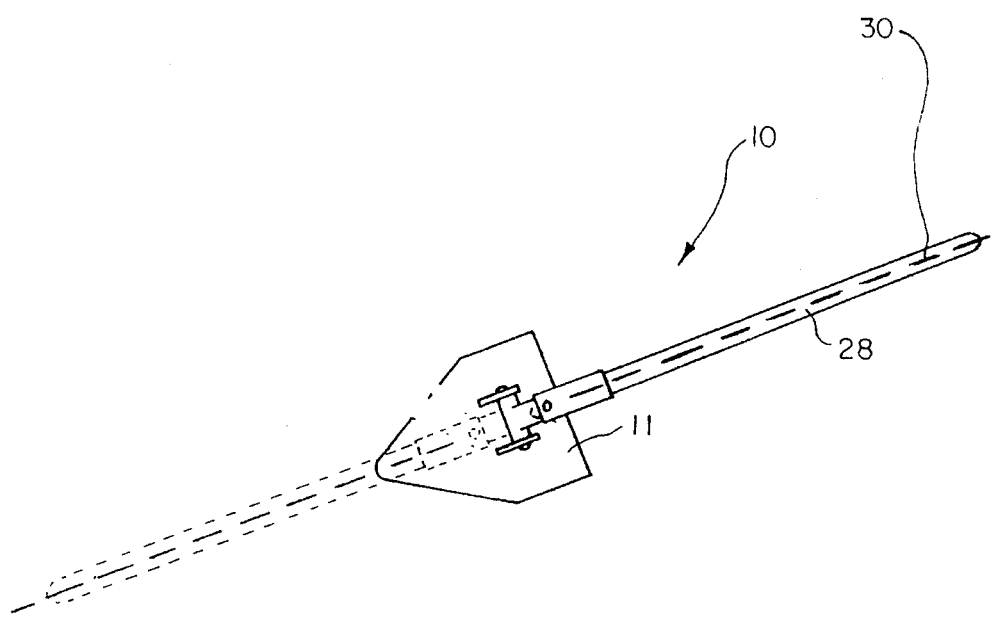

Handle assembly 12 is pivotal into positions substantially parallel to the plane of head assembly 11, permitting the windshield glass 22 to be scrubbed in narrow recesses above dashboard 23. (FIGS. 3 and 4) The handle rotation into this position occurs about a pivot pin assembly 24 held by a pair of spaced apart pivot posts 25 upstanding from head upper plate 13. A pivot sleeve 26 carries a radially extending lug 27 joined to handle shaft 28 through a connector 29. Sleeve 26, integral lug 27, shaft connector 29 and handle shaft 28 may be rotated together substantially through a full 180° angle with respect to head assembly 11 in a plane 30 perpendicular to upper plate 13 and head pivot pin 24. (FIG. 5) The handle positions of FIG. 5 achieved by rotation about head pivot pin 24, do not alone permit placement of head assembly 11 into all corner niches. However, handle shaft 28 may be rotated also about a lug pivot pin assembly 31, which is perpendicular to lug 27 and lies in plane 30. Lug pivot pin 31 engages shaft connector 29 through clevis member 32.

Figure 6:
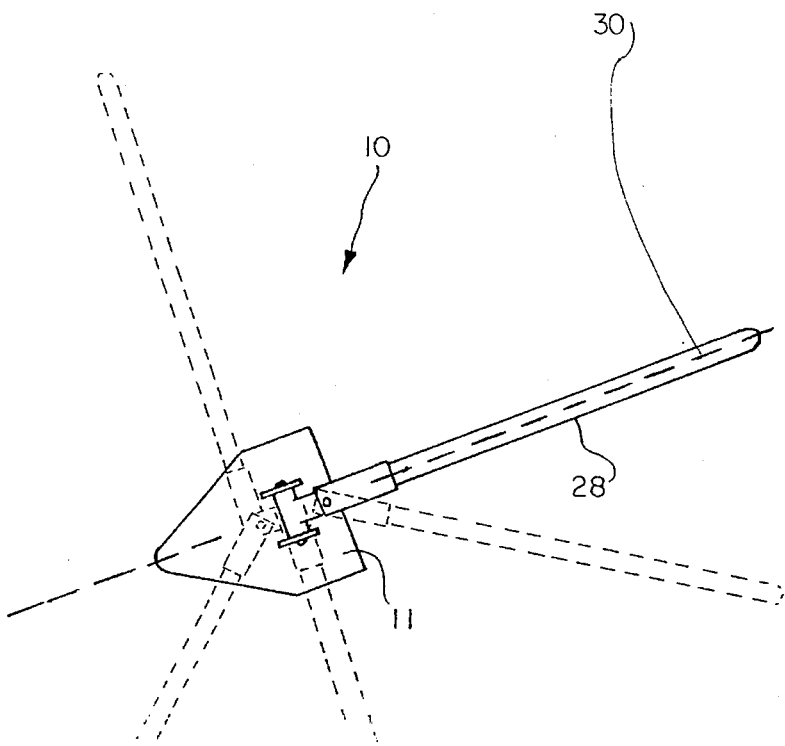

Handle shaft 28 may be rotated about lug pivot pin 31 substantially through a full 180° angle laterally to plane 30 from any rotated position about head pivot pin 24. (FIG. 6) Complete access to difficult to reach niches is provided by combining rotation about head and lug pivot pins 24 and 31 respectively.

The double axis pivot feature is also useful for wiping the more accessible portions of the inside of the windshield, often permitting the complete area to be wiped from one user position. Inside glass surfaces other than that of the windshield, as well as exterior side and rear window surfaces, may also be cleaned by wiper assembly 10, providing that large amounts of water are not required.

Figure 7:
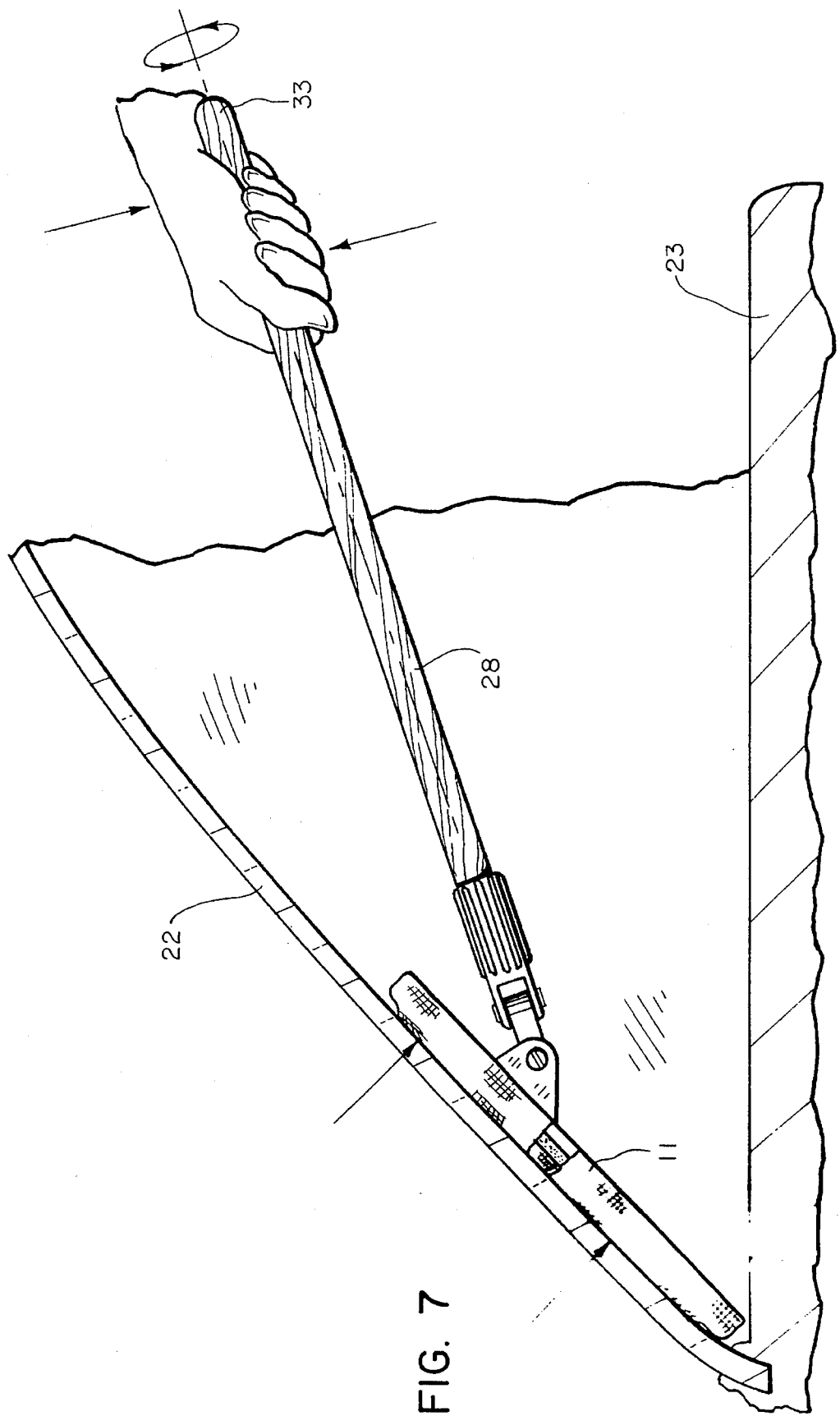

Because head pivot pin 24 is at the approximate geometric center of head assembly 11, evenly distributed pressure force can brought to bear upon the glass by twisting the end 33 of handle shaft 28. Variation of localized force on some portions of the head may be achieved by twisting the handle simultaneously in the plane perpendicular to its axis. (FIG. 7) Such localized pressure application could not be applied were a universal, rather than a biaxial, pivot connector utilized.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description and all changes that come within the meaning and range of equivalency of the claims are therefore intended to be embraced therein:

What is claimed and desired to be secured by United States Letters Patent is:

1. A windshield glass scrubbing and wiping device comprising:

a substantially rigid planar wiping head assembly having a forward, glass facing side and an opposite rear side;

an elongate handle means secured biaxially pivotable to the wiping head on the rear side thereof, said handle means comprising;

a sleeve member to which the elongate handle is secured pivotally;

a pair of spaced pivot posts outstanding from the rear side of the wiping head, and means pivotally securing the sleeve member thereto; wherein the sleeve member pivots about an axis parallel to the plane of the wiping head; and the handle pivots in a plane perpendicular to the sleeve pivot axis; wherein the handle means is rotatable into a position substantially parallel to and against the wiping head;

wherein the wiping head assembly comprises;

a substantially rigid rearmost plate having a glass facing side and a rearward side;

a layer of resilient material having a glass facing side and a rearwardly facing side, said layer being secured to the glass facing side of the rearmost plate;

a reversible glass wiping material assembly secured to cover the glass facing side of the resilient material, said wiping material assembly comprising;

a pair of sheets of strong scrubbing paper, a moisture absorbing pad between the pair of sheets of scrubbing paper, wherein said pair of sheets have matching edge portions thereof extending beyond the pad, said matching portions being adhesively joined together to form flap portions each having a pair of opposite sides each carrying adhesive strips for attachment of the wiping material assembly to the wiping head.

2. The scrubbing and wiping device of claim 1, wherein:

the wiping head comprises five straight edges, two of which converge outwardly to form an outstanding tapering tip.

* * * * *